United States Patent [19]
Matheney

[11] 3,759,422
[45] Sept. 18, 1973

[54] BEVERAGE MIXING AND DISPENSING APPARATUS

[76] Inventor: Richard H. Matheney, 233 W. 64th St., Los Angeles, Calif. 90003

[22] Filed: Nov. 8, 1971

[21] Appl. No.: 196,487

[52] U.S. Cl. .......................... 222/129.4, 222/144.5
[51] Int. Cl. ............................................. B67d 5/56
[58] Field of Search ................ 222/129.1, 129.2, 222/129.3, 129.4, 144.5

[56] References Cited
UNITED STATES PATENTS

| | | | |
|---|---|---|---|
| 3,160,324 | 12/1964 | Nixon | 222/129.3 X |
| 3,341,078 | 9/1967 | Cardillo | 222/129.4 |
| 2,515,570 | 7/1950 | Rubinfield | 222/144.5 |
| 3,323,681 | 6/1967 | DiVette | 222/129.3 |

Primary Examiner—Robert B. Reeves
Assistant Examiner—Thomas E. Kocovsky
Attorney—S. J. Lehrer

[57] ABSTRACT

A mixing and dispensing apparatus for alcoholic and soft beverages. A stand has receptacles receiving inverted bottles of the beverages. The rate of discharge from the receptacles is controlled by primary valves to lead the beverages into a mixing chamber having a dispensing outlet. The inlets to the mixing chamber are controlled by secondary valves. A table extends from the stand and has a control knob depressible to operate the secondary valves selectively for alcoholic beverages; and independent dials are operable alternately with the alcoholic beverage controls to open secondary valves pertaining to the soft beverages. The knob and dials are rotatable to clear the controls and afford direct opening of all the secondary valves by the added depression of the knob.

6 Claims, 9 Drawing Figures

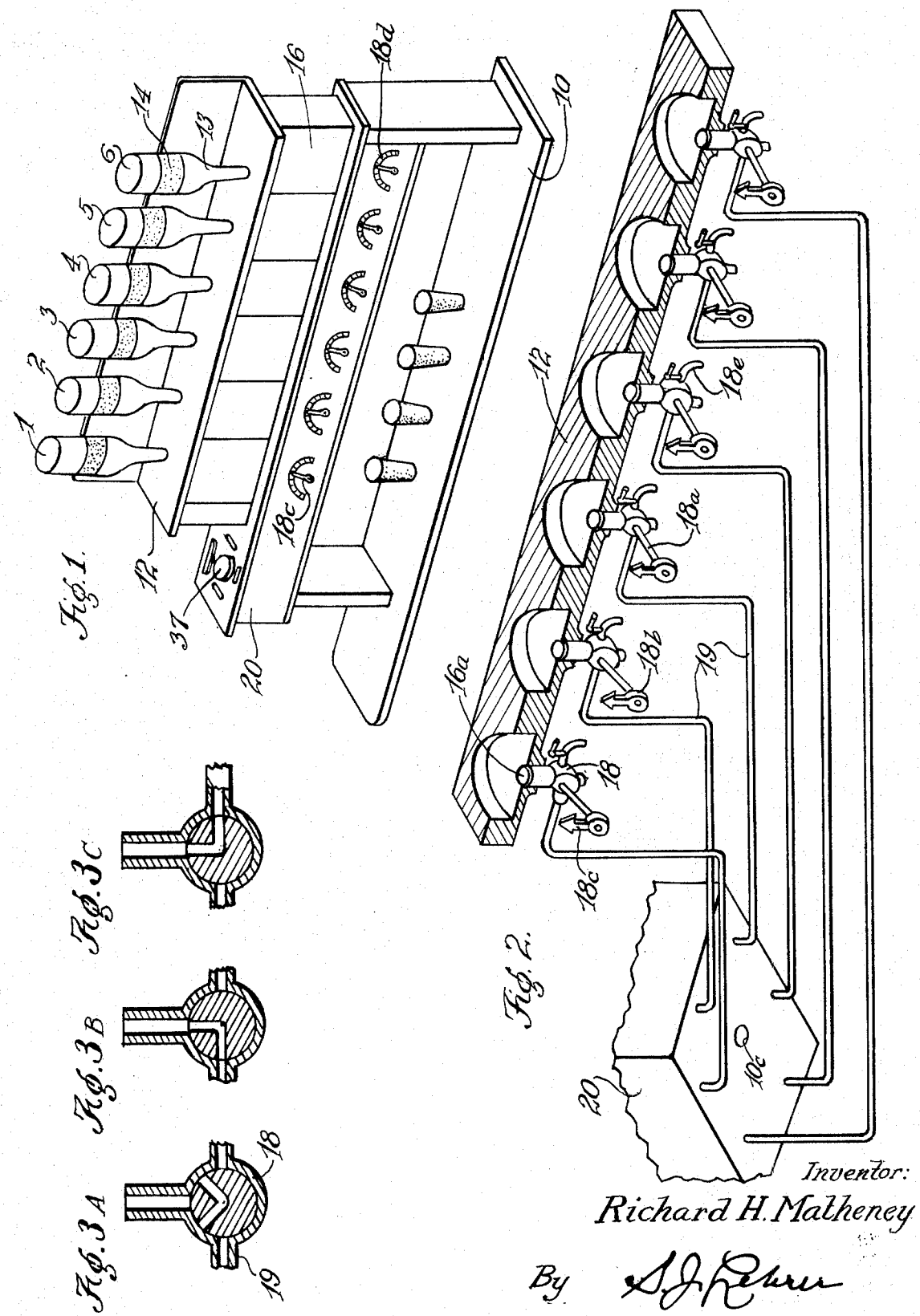

Inventor:
Richard H. Matheney
By S. J. Rehrer
Attorney.

BEVERAGE MIXING AND DISPENSING APPARATUS

My invention relates to apparatus for storing and serving alcoholic and soft drinks, and more particularly to means for mixing and dispensing desired drink portions and combinations.

One object of the invention is to provide an apparatus which is compact and portable and, therefore, suitable for installation on a counter, table or other convenient support.

A further object is to provide an apparatus of the above character which presents handy controls for dispensing single and multiple drinks of liquor, separate soft drinks known as chasers, and a combination of liquid and soft drinks.

Another object is to employ parts and operations in the apparatus which are simple and dependable in action.

A final object is to provide an apparatus of the above character which is manually controlled and requires no power or electrical connections.

A better understanding of the invention may be gained by reference to the accompanying drawings, in which:

FIG. 1 is a perspective view of the main portion of the apparatus;

FIG. 2 is an enlarged perspective view, partly in section, showing a series of controls for liquids passing from a storage facility to a mixing unit;

Figure 4:
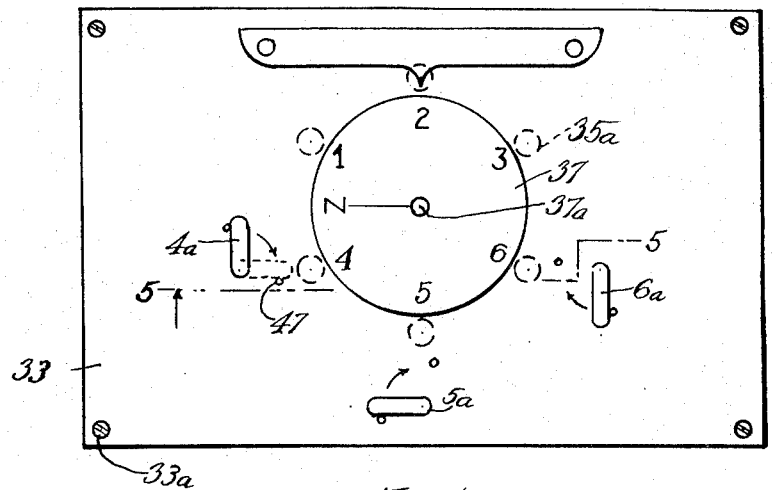
Figure 5:
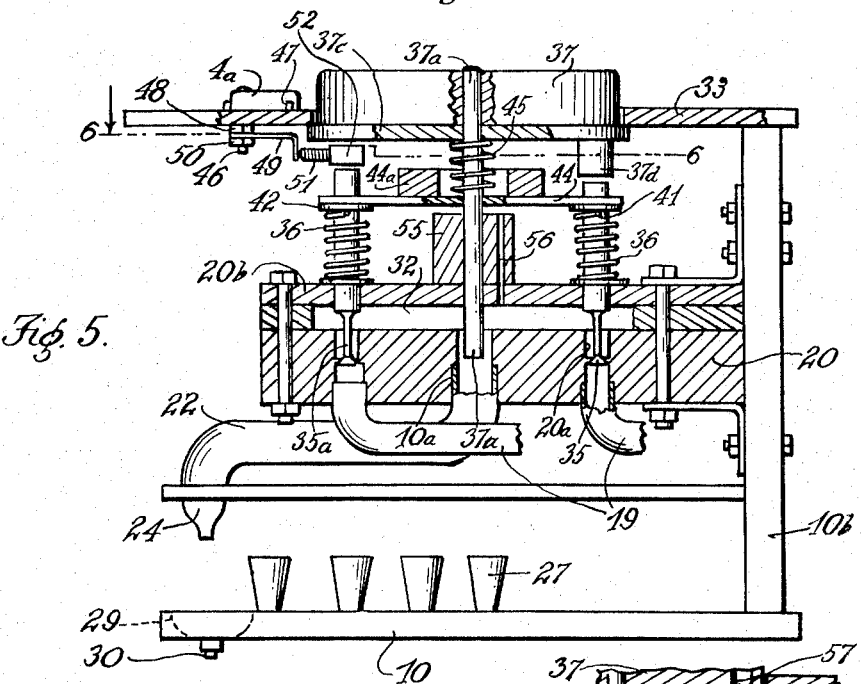
Figure 6:
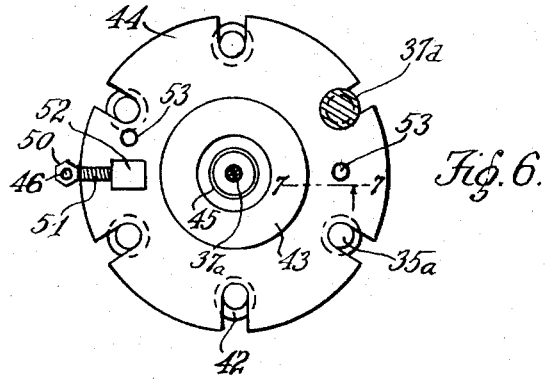

FIGS. 3A, 3B, and 3C are is a further enlarged sections of valves employed in the controls of FIG. 2;

FIG. 4 is a plan view of the mixing unit;

FIG. 5 is a section of the mixing unit on the line 5—5 of FIG. 4 and showing a dispensing feature;

FIG. 6 is a section on the line 6—6 of FIG. 5; and

Figure 7:
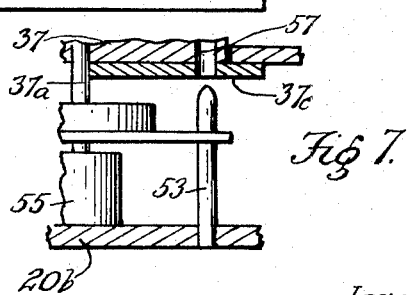

FIG. 7 is a section on the line 7—7 of FIG. 6.

Referring specifically to the drawings, 10 denotes a stand which comprises the main unit of the apparatus. The top of the stand is in the form of a rack 12 which receives a series of the original containers or bottles 13 of the liquors and soft drinks in inverted position, as shown in FIG. 1. For purposes of example the bottles are marked 1 to 6. Actually, however, they will bear labels 14 readable to identify the contents of each bottle. For the present it may be assumed that the bottles 1, 2 and 3 contain assorted liquors, while the bottles 4, 5 and 6 contain soft drinks, such as ginger ale, orange juice or simply water. The rack allows the contents of the bottles 13 to fill a series of compartments 16. Thus, when a bottle becomes empty, this is notice that its compartment needs replenishing by replacing the empty bottle with a full one.

FIG. 2 shows that the compartments 16 have bottom outlets 16a into a series of valves 18 which lead into a set of pipes 19. The valves are of the conventional cylinder type — as shown in FIG. 3 — with the rate of flow controlled by turning a spindle 18a. Each spindle carries a knob 18b and a pointer 18c which operates along a dial 18d to indicate settings for desired rates of flow. Also, each valve can be turned from the closed position A indicated in FIG. 3 to the dispensing one B and to a position C to direct the flow into a discharge faucet 18e in case it is desirable to drain or clean out the particular compartment 16.

As indicated in the lower part of FIG. 2, the pipes 19 lead upwardly into a housing 20 situated at one end of the stand 10. The housing may be square — as shown — or of any other form; and the pipes are arranged in a circle, as indicated in FIG. 2, where they connect with the housing. FIG. 5 shows two of the pipes as inlets; and the center of the housing has an outlet 10a for a discharge pipe 22 which terminates with a dispensing spout 24. This is the terminal outlet of the apparatus; and it is positioned over a base of the stand 10 on which a supply of drinking glasses 27 may be kept. The spout 24 is located above a draining tray 29 which leads into a discharge pipe 30.

It is noted in FIG. 5 that a table 33 is situated above the housing 20. FIG. 4 shows that this table is rectangular. Preferably, the housing and table are carried by side supports 10b of the stand 10; and FIG. 4 shows that the table may be secured to such supports by screws 33a.

FIG. 5 shows that the inlet pipes 19 lead into passages 20a which communicate with a horizontal chamber 32. Thus, liquids entering this chamber from the inlet pipes become mixed before they drain into the central outlet pipe 22. However, admission into the mixing chamber for liquids from the inlet pipes is controlled by a series of valves 35 carried by vertical stems 35a. These pass through the top 20b of the housing, and are operable downwardly against compression springs 36 to open the valves.

A manual control is provided for the valves 35 in the form of a knob 37 mounted in the table 33. The knob carries a pendent center pin 37a, and has an enlarged base 37c under the table 35. A button 37d depends from the base 37c at a point in the circular course of the valve stems 35a. Thus, when the button is over a given valve stem, as in FIG. 6, depressing the knob 37 will open the valve and admit liquid from the corresponding source into the mixing chamber 32 to be dispensed from the spout 24.

FIG. 5 shows that the compression springs 36 are backed at the top by cross-pins 41 which are overlaid by washers 42. The center pin 37a passes freely through a plate 44 which rests on the washers 42 and is indented edgewise to clear the valve stems 35a. The plate carries a horizontal reinforcing ring 44a; and a compression spring 45 surrounds the post 37a between the knob base 37c and the plate 44. The spring urges the base upwardly to normally keep the knob 37 in the top position shown by maintaining a marginal stop against the under side of the table, as seen in FIG. 5.

Since alcoholic drinks are usually the principal ones served in a drink-dispensing apparatus, let it be assumed that the operation of the button 37d offers a choice of liquors from the bottles 1, 2 and 3 by partial turns of the knob 37. However, a choice of soft or chaser drinks is also available by the depression of the knob. A set of swing dials 4a, 5a and 6a is mounted on the table 33 opposite the markings 4, 5 and 6 of the knob. Each swing dial is pivoted to the table at 46 to permit a partial turn to the dotted-line position shown in FIG. 4 to a stop pin 47. This position is indicated in FIG. 5. Underneath the table the pivot pin 46 is threaded to receive a securing nut 48, a wire 49 and a lock nut 50. The wire carries a horizontal coil spring 51 which terminates with a button 52. When one of the dials 4a, 5a or 6a is swung as stated, the button assumes a position above a corresponding valve stem 35a. Now, when the knob 37 is depressed the button 52 will bear down on the valve stem and admit the corresponding soft drink into the mixing chamber 32. It is understood that the supporting spring of the button 52 keeps it level before and while it is swung as mentioned, but allows the button to be depressed when it is in the swung position. Also, the applied positions of the button 52 alternate with applied positions of the button 37d to be clear of the liquor valves when any soft drink swing dial is operated.

The rotary function of the knob 37 is limited — in the present example — to controlling the admission of liquors from the bottles 1, 2 and 3. Therefore, oppositely-located rods 53 rise from the housing top 20b to serve as stops for the button 37d within a half-turn of the knob. Thus, the button can at no time enter the zone of the soft drink buttons 52 to interfere with the same. At this stage of the operation it is apparent that the knob 37 is rotatable to any of three points to secure the admission of a corresponding liquor; also, that any number of the swing dials may be swung and the knob 37 depressed to secure a corresponding chaser to mix with the alcoholic drink first admitted.

It is at times desirable — such as at a special occasion — to serve a mixture of all the drinks, commonly called a Zombie. This may be done in the present apparatus with one movement, without operating the control buttons, and by merely rotating the knob 37 to point with a line Z thereon — see center, FIG. 4 — to keep the button 37d out of line with the nearest valve stem. As seen in FIG. 5, the central spring 45 is lighter than the valve springs 36 and only serves to hold the plate 44 down on the washers 42. Now, in case all the valves have to be depressed for a Zombie, it is only necessary to bear down on the knob 37 with more force. This will cause the plate 44 to depress the washers 42 and in turn the cross-pins 41 and the valve stems. All will descend, procuring an admission and mixture of all the drinks. A block 55 rising from the housing top 20b forms a guide for the sliding of the center pin 37a and a stop for the descent of the plate 44; and the block and the housing top have a vent passage 56 to relieve air pressure in the mixing chamber. Also, the base 37c and the plate 44 have holes 57 to clear the rods when the knob 37 is given the added downpressure.

It is now apparent that the present apparatus defines an assortment and choice of alcoholic drinks, an assortment and choice of chaser drinks, and simple means above the table to procure drinks in any amount or combination. Also, the apparatus is of a simple nature and so compact that it may be kept on a handy counter and operated with ease.

I claim:

1. An apparatus for dispensing beverages composed of at least one liquid from a selection of a plurality of different liquids of one or more classes comprising a unit having a receptacle for each of said liquids; first valve and conduit means connected to each receptacle to discharge the liquid from each receptacle at a controlled and variable rate; and a dispensing unit connected with said valve and conduit means comprising a depressible knob to select one or more of said liquids from one class rotatably mounted in the top of said dispensing unit in a biased condition and having indicia on the top surface of said knob to identify each of said liquids and at least one dial pivotally mounted on said top adjacent said knob to select the liquid of another class to be mixed with the liquid of said one class selected by rotating the knob to the proper indicia, said dial being operative with said depressible knob, second valve means for each conduit actuated by said knob and dial to allow simultaneous flow of said selected liquids from their respective conduits, said second valve means being mounted on a housing within said dispensing unit and arranged concentrically about and below said knob and dial and within the periphery of said knob, each valve means being movable through a passage in said housing to which passage a conduit is connected, means to receive said simultaneous flows in mixing relationship comprising a chamber within said housing connected to said conduits by said passages and means to discharge said mixed liquids from said liquid receiving means.

2. An apparatus according to claim 1 wherein said knob has a pendent primary button on the underside, the rotation of said knob locating the button over a selected second valve means, first downpressure on the knob causing the button to depress said valve means and open the passage to the chamber.

3. An apparatus according to claim 2 wherein each pivotal dial has attached thereto on the underside a button operable on the movement of said dial to place the button over the second valve means pertaining to said one class of beverages, the applied locations of said dial buttons alternating with those of said primary button.

4. An apparatus according to claim 2 further comprising an independent depressor for all the second valve means positioned concentrically below said knob and in selective contact with said second valve means, such depressor yielding to additional down-pressure on said knob when the primary button is not aligned with any valve relating to said button.

5. An apparatus according to claim 3 further comprising stops to prevent the primary button from entering the area of said dial buttons.

6. An apparatus accoring to claim 4 further comprising a central spring between the knob and the depressor and individual springs for said second valve means, said central and individual springs being compressible in unison when said additional down-pressure is applied to said knob.

* * * * *